United States Patent [19]

Van Huis

[11] 4,112,872
[45] * Sep. 12, 1978

[54] POULTRY CAGE SYSTEM WITH POULTRY REMOVAL

[75] Inventor: Robert L. Van Huis, Zeeland, Mich.

[73] Assignee: U.S. Industries, Inc., New York, N.Y.

[*] Notice: The portion of the term of this patent subsequent to Feb. 22, 1994, has been disclaimed.

[21] Appl. No.: 702,339

[22] Filed: Jul. 2, 1976

Related U.S. Application Data

[63] Continuation of Ser. No. 504,968, Sep. 12, 1974, Pat. No. 4,008,690.

[51] Int. Cl.² .............................................. A01K 29/00
[52] U.S. Cl. ...................................... 119/22; 172/17; 172/82
[58] Field of Search ...................... 119/22, 17, 19, 82, 119/18, 30; 214/16.4 R

[56] References Cited

U.S. PATENT DOCUMENTS

| | | | |
|---|---|---|---|
| 3,109,413 | 11/1963 | Patchett | 119/17 X |
| 3,110,388 | 11/1963 | Elliott | 119/82 X |
| 3,396,703 | 8/1968 | Trussell | 119/30 |
| 3,476,089 | 11/1969 | Jerome | 119/82 |
| 3,602,198 | 8/1971 | Tackett | 119/82 |
| 3,718,118 | 2/1973 | Bibler | 119/82 |
| 3,753,507 | 8/1973 | James | 214/16.4 R |
| 4,008,690 | 2/1977 | Van Huis | 119/82 |

Primary Examiner—Richard J. Johnson
Attorney, Agent, or Firm—Price, Heneveld, Huizenga & Cooper

[57] ABSTRACT

A plurality of cages are arranged side-by-side on a frame in one or more horizontally spaced rows and if desired in spaced vertical tiers. The commonly facing sides of each spaced row include coverable access openings and poultry confined in the cages are removed through the openings onto a generally horizontally moving conveyor movable vertically adjacent the cage openings to each tier. Preferably, the conveyor is an endless belt type and each tier includes horizontally spaced rows vertically spaced above each other, the conveyor being movable vertically between the rows.

2 Claims, 4 Drawing Figures

POULTRY CAGE SYSTEM WITH POULTRY REMOVAL

CROSS REFERENCE TO RELATED APPLICATIONS

This application is a continuation application of copending application, Ser. No. 504,968, filed Sept. 12, 1974, by Robert L. Van Huis, entitled POULTRY CAGE SYSTEM WITH POULTRY REMOVAL, and now U.S. Pat. No. 4,008,690.

BACKGROUND OF THE INVENTION

This invention relates to a poultry cage system, and more particularly to a unique way of discharging poultry from cages for transportation.

In accordance with the prior art, poultry such as chickens are generally placed shortly after birth into growing cages where they are raised for a specific length of time, generally a specific number of weeks. After such time period has lapsed, they are removed from these cages for slaughter (in the case of fryers) or to special poultry houses (for layers). The particular operation of removing the poultry from their initial cages is costly and time consuming. It involves an excessive amount of labor since confined poultry tend to be nervous when an attempt to physically remove them from their cages is undertaken. Also, when poultry are raised in large numbers, they are generally housed in large complex structures comprising many many rows of cages arranged in tiers. Thus, it is extremely inconvenient for an attendant to gain immediate access to all the individual cages for removal of the poultry therefrom. While attempts have been made to urge the poultry from their cages through proper openings onto access ways which lead toward a collection point, such attempts have been unsuccessful. The poultry resist moving toward a discharge end without positive physical manipulation.

In addition to the foregoing disadvantages, it has been difficult in accordance with the prior art to simply urge the poultry to leave the cages they are confined within. Part of this difficulty is the basic nature of the poultry which as pointed out above tends toward that of excitability which results in the poultry tending to want to stay within the cage it is confined within. The configuration of prior art cages however have contributed to this difficulty by the presence of an access opening in one of the partitions of the cages with a remaining partition portion on the same side. In these cases, the poultry required to be driven through a defined opening in one side of the cage tend to seek an avenue toward the position along that panel which remains and hence blocks its passage from the cage. Thus, there is a need in this art for an improved poultry cage construction.

SUMMARY OF THE INVENTION

In accordance with the invention, live poultry are removed by urging the poultry from the cage directly onto a moving conveyor which transports the poultry to a desired collection point.

In narrower aspects of the invention, the cages are in rows arranged in vertically spaced tiers, each tier comprising a pair of horizontally spaced rows. The conveyor means is movably mounted vertically between each pair of rows to accommodate the removal of poultry at different levels with a single conveyor mechanism. Shute means at one end of the conveyor are movable at varying inclined angles to the conveyor means to deposit the poultry at a particular spot affixed by the base. Preferably, the conveyor means is an endless belt and the poultry is enclosed by the belt so that they must move to their desired location.

In other narrower aspects of the invention, the access opening in each cage through which the poultry pass is formed by a two-part panel which folds inwardly opening the entire side adjacent the conveyor means. A cable attached to the lower margin of the lower panel causes the panel to fold upwardly and inwardly. Panels close automatically upon release of the cable by their gravitational weight.

One of the more significant advantages of the subject invention is that it provides a unique method and means for transferring poultry from their intended raising cages to a vehicle or the like without having to manually handle each bird or in the alternative prod it along a shute or the like. Instead, the birds are automatically conveyed to the vehicle or other desired locations for packing. Further, multi-tiered cage systems are easily dealt with by making the conveyor means movable vertically. The utilization of an endless conveyor belt makes for sanitary and harmless handling in that the belt does not injure the poultry and it can easily be cleaned. The unique cage doors or panels also greatly facilitate the removal of the poultry onto the conveyor further reducing prior complications.

DESCRIPTION OF THE PREFERRED EMBODIMENT

Figure 1:
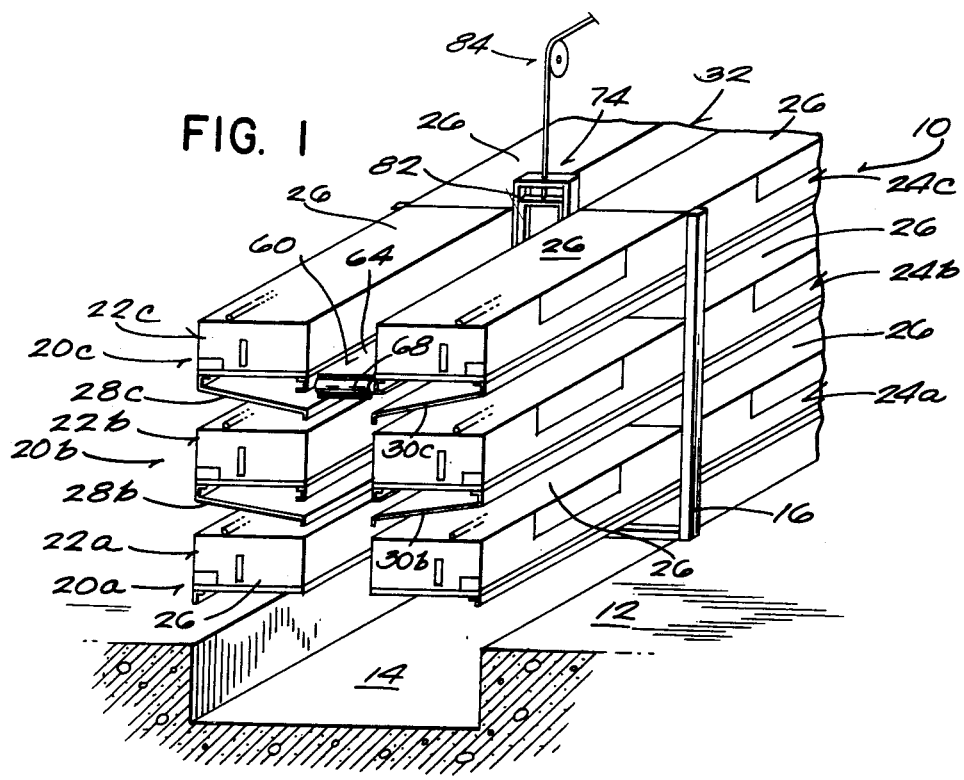

Referring now to the drawings in detail, and particularly FIG. 1, a multi-tiered cage system 10 is supported on a floor 12 over a pit 14 by a frame 16. Only fragmentary portions of frame 16 are shown in the drawings. The system shown comprises three tiers, 20a, 20b and 20c each tier having a pair of facing rows of cages 22a, 24a; 22b, 24b; and 22c, 24c. The individual cages 26 are joined end-to-end forming the various rows.

The individual cages are preferably made of mesh-like panels (FIGS. 3 and 4) allowing droppings to fall through to pit 14. The rows of cages above the bottom rows each have dung collecting trays 28b, 30b and 28c, 30c which are elongated and positioned beneath them to prevent droppings from falling directly onto poultry confined in the cages therebeneath. The trays 28b, 30b and 28c, 30c are inclined inwardly and downwardly so that dung collected thereon is urged toward the center spacing 32 which extends vertically upwardly between each pair of opposing rows so that dung will fall directly into pit 14. Appropriate scraping blades (not shown) can be utilized to periodically clean or scrape each tray as well as collect dung in pit 14 for removal therefrom.

The foregoing constitutes a brief description of a particular multi-tier system, it being well within the state of this art to construct a variety of such systems with a variety of arrangements.

Figure 4:
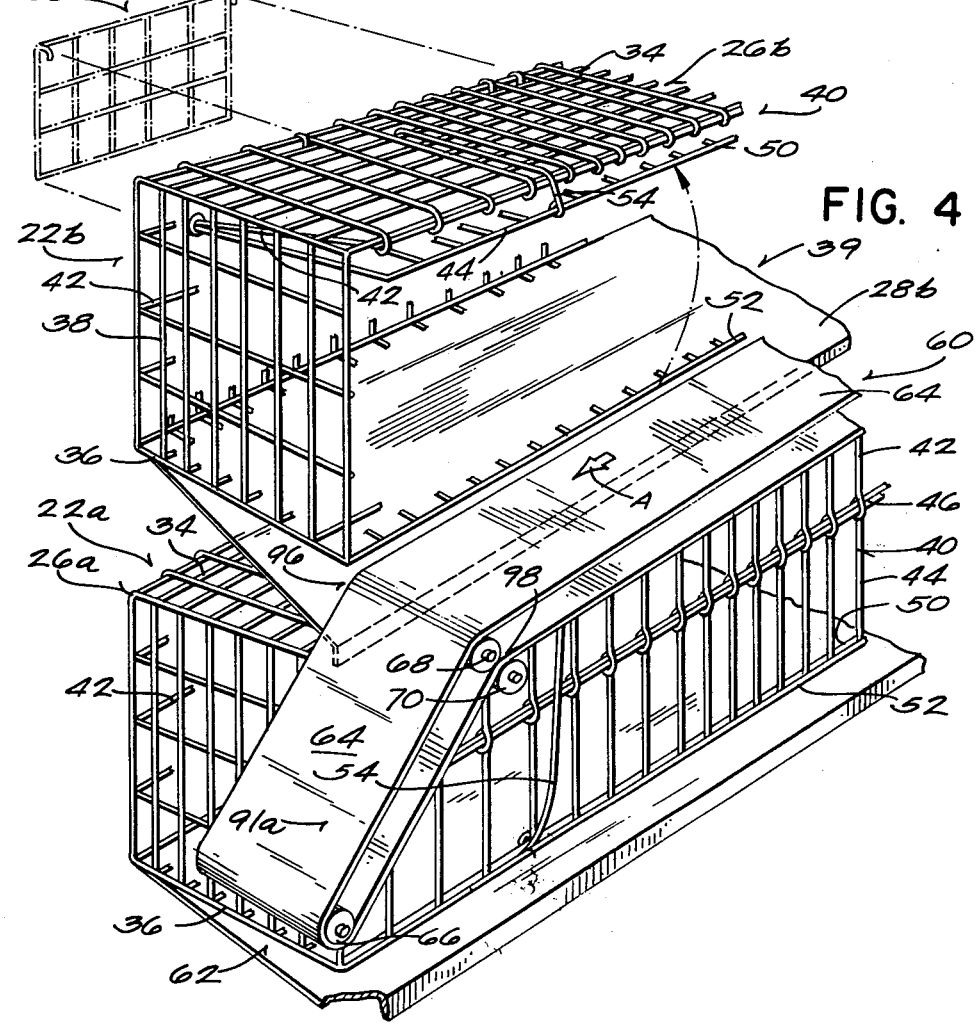

Referring specifically to FIG. 4, the end cages 26a and 26b are illustrated respectively of rows 22a and 22b. The cages are identical comprising top and bottom panels 34, 36; spaced end panels 38, 38 (only one being shown) and front and rear panels 40, 42. The front panel 40 or a portion thereof is designed to provide an opening when desired to permit poultry confined within the cages 26 to be removed from the cage or remove themselves from the cage.

Front panel 40 is comprised of an upper portion 42 and a lower portion 44 hinged relative each other about an axis 46 whereby they are foldable relative each other between a closed position illustrated in FIG. 4 with respect to page 26a wherein the two portions 42 and 44 are suspended vertically in essentially the same plane forming a flat front panel and an open position wherein they are folded up against each other in essentially overlapping planes as illustrated by cage 26b. In the open position, the entire front portion of the cage is open permitting poultry therein to freely exit the cage.

Without restraint, panel 40 is designed to extend vertically into the closed position by its gravitational weight with the bottom marginal stringer 50 being captured behind the outer marginal stringer 52 of bottom panel 36. The two panel portions 42 and 44 are designed not to pivot relative each other in the opposite direction when they are in the vertical closed positions so that poultry confined within the cage which bodily move against the panel in its closed position are firmly locked therein.

Front panel 40 may be easily opened by providing a wire cable 54 attached at one end to the bottom marginal stringer 50 and threaded appropriately through front panel 40 and top panel 34. By pulling on cable 54, the two panel portions 42 and 44 will be folded upwardly and inwardly to open the front panel of the cage. A hook or the like (not shown) can be attached at the opposite end of cable 54 and simply looped over one of the stringers on the cage to hold the front panel 40 in its open position.

It has been found that even with the front panel entirely open, poultry confined within are not necessarily inclined to leave the cage. While objects can be asserted into the cage to prod the poultry, this is not necessarily effective and can injure the birds. A small pivotal opening panel 58 may be provided on the back panel 42 to permit the operator to manually reach in and eject the poultry out the front opening.

The poultry which are ejected out of the cages through the opening 39 defined by the movement at front panels 40 will be positioned within spacing 32 between the respective rows of cages. To convey the poultry from a position adjacent their respective cages to a distribution point for packing or otherwise, a conveyor mechanism 60 is provided to move the poultry to a discharge point 62. The conveyor mechanism 60 is illustrated in FIG. 4 as an endless belt 64 which moves endlessly about a pair of end rollers. End roller 66 is illustrated in FIG. 4 as are a pair of take-up rollers 68 and 70. The exact details of the remaining portion of the conveyor mechanism is not illustrated it being well within the skill of this art to provide an appropriate power source and take-up assembly. The upper run of belt 64 is driven in the direction of arrow A (FIG. 4) to urge the poultry toward discharge end 62. The rate of movement of conveyor belt 64 is preferably below 120 feet per minute. It has been found out that with greater speeds, the poultry thereon begin to treadmill. Also, it cannot be too fast or the poultry will be upset upon moving on to the conveyor belt which could injure them. The speed at the same time should be sufficient enough to overcome any inclination by the poultry to move under their own power in the opposite direction at a rate greater than that of the conveyor belt. Since more than one bird will be on the conveyor at one time, this is undesirous in and of itself since it could cause confusion and panic.

Figure 2:
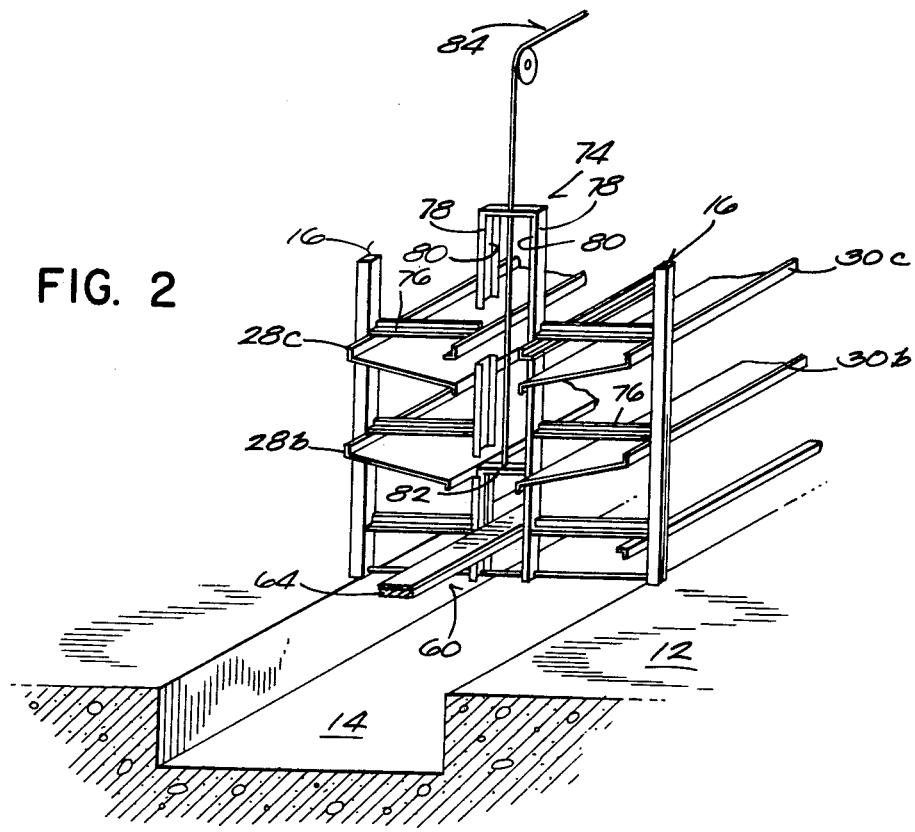

Since the concept of this invention is particularly adapted for a multi-tier installation, the conveyor mechanism 60 is designed to be positioned at different levels depending on which tier of cages are being emptied. Referring briefly to FIGS. 1 and 2, a support structure 16 is identified which supports the multi-tiered assembly 10. While the actual support structure itself may take on various configurations, the essential aspect is to firmly support each of the individual tiers of cages from each side. This is generally done by providing various spaced uprights and cross support structures.

With more particular reference to FIG. 2, an inner frame housing 74 is anchored to the horizontal portion 76 of frame structure 16 with several of the frame structures being spaced longitudinally along the assembly 10. The inner sub-frame is comprised of a pair of spaced vertically extending channel members 78 having inwardly opening trackways 80 in which a yoke 82 is confined for vertical movement. The conveyor mechanism 60 is anchored firmly to yoke 82 so that it can be raised or lowered in its entirety jointly with the spaced yokes sliding in the trackways 80 of the sub-frames 74. Rollers could be used to facilitate sliding movement.

The yokes 82 can be actuated by a cable-pulley arrangement 84 which raises or lowers the yokes to the desired cage levels. To insure against accidental movement of the yokes and suspended conveyor mechanism during operation, the vertical members 78 or a vertical member associated therewith can be provided with a plurality of spaced notches in which a gravitationally weighted dog will lock into engagement with a particular notch at a selected height to physically prevent lowering of the conveyor mechanism except upon physical removal of the weighted dog from the selected notch to permit vertical movement. Accidental movement upwards will not occur due to the weight of the conveyor mechanism itself.

Figure 3:
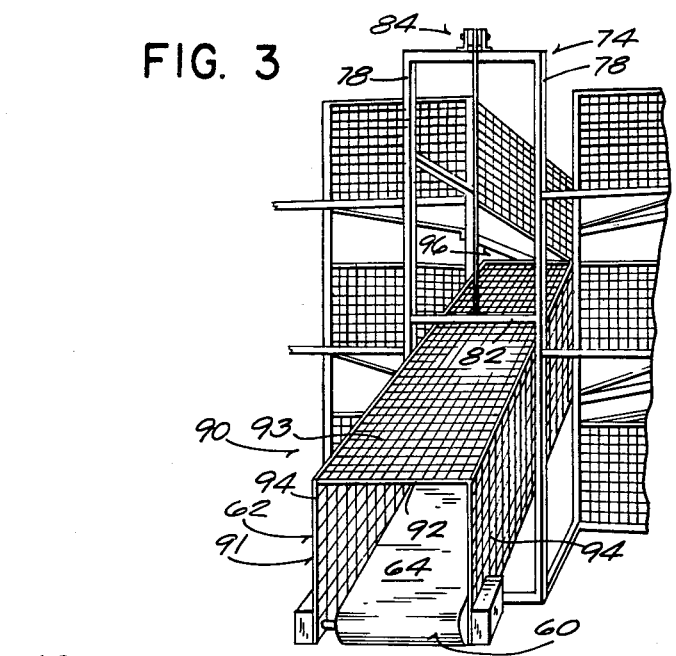

During transportation of the poultry along conveyor mechanism 60, it may be desirable to confine the poultry within spacing 32 on the conveyor belt 64. With reference to FIG. 3, an enclosure means 90 the discharge or shute portion 91 of the conveyor mechanism 60 is illustrated having a mesh paneled roof 93 and sides 94 with the conveyor belt 64 forming the bottom. In this fashion, the poultry are prevented from flying or jumping upwardly in the spacing 32 and hence are confined strictly to movement along the conveyor belt. While the discharge portion 91 is shown having side panels 94, the significance of which will be described hereinafter, that portion of the enclosure means 90 positioned within the cage assembly itself need not have sides since the cages themselves form such sides. Is is preferable however to provide the roof portion 92 which can be anchored to the sub-assembly 74 along the vertical channel members 78.

Referring now to both FIGS. 3 and 4, since the conveyor mechanism 60 is positioned at various levels, a discharge portion 91 is provided which is adjustable to different angles of inclination so that regardless of the level at which poultry are being discharged, they will be brought to a common discharge location identified by reference numeral 62. The discharge portion 91 is completely enclosed as previously described by a top panel 92 and side panel 94. It is pivotally connected to the remaining portion of the conveyor mechanism at the termination of the cage assembly indicated generally by the reference numeral 96. The conveyor mechanism is pivotally arranged as illustrated in FIG. 4 by a pair of idler rollers 68 and 70 positioned in proximity to each other forming a nip 98 through which the lower run of the belt is set. In this fashion, the discharge belt portion 91a of conveyor mechanism 60 can be swiveled or pivoted relative the remaining portion at transition 96 depending on the level of cages being discharged.

OPERATION

Having described in detail the specific arrangement of the preferred embodiment, its operation should be readily understood. With a multi-tiered assembly 10 of the type illustrated in the drawings, and assuming it is desirous to discharge the poultry confined within the cages arranged in the second tier 20b, namely cages 26 in rows 22b and 24b, the conveyor mechanism 60 is raised by the cable pulley arrangement 84. An appropriate power supply (not shown) can be utilized. The conveyor mechanism is preferably locked into position by lock means such as that described with relation to the weighted dog mechanism. The conveyor belt 64 is then started and as will be appreciated, it flows at a horizontal level adjacent the cages in spacing 32 and at an incline at discharge 90. The attendant then simply pulls the cable 54 of each cage on the second level and latches it so that the front panels 40 are in their fully opened position. The cages need not be opened up all at once and preferably will not be to assure sufficient space on the conveyor belt for all of the poultry. Thus, cages can be opened and closed sequentially since the rate of arrival of the poultry at discharge end 90 must correspond to the help or structure located thereat to handle the birds for further transportation. Generally, most of the poultry confined within the cages will move onto the conveyor although it may be necessary to prod reticent birds. In such cases, sub-panel 58 may be opened on front panel 42 and reticent birds may be manually urged out of the cage. The poultry are then moved by the conveyor to the discharge end 90. It is recommended that the order of discharge begin with the cages in the closest proximity to discharge end 90 so that as poultry are conveyed along conveyor mechanism 60, they are not conveyed past poultry confined within adjacent cages since this will tend to excite both the poultry within the cages and on the conveyor. As each cage is emptied of course, the respective panel 40 should be closed so that as poultry are conveyed thereby, they do not have the opportunity to get off the conveyor belt into a different cage. With the panels closed in this fashion, a complete enclosure is provided both along the cages within space 32 and as previously described at the discharge end 90.

Although but one embodiment has been shown and described in detail, it will be obvious to those having ordinary skill in this art that the details of construction of this particular embodiment may be modified in a great many ways without departing from the unique concepts presented. It is therefore intended that the invention is limited only by the scope of the appended claims rather than by particular details of construction shown, except as specifically stated in the claims.

The embodiments of the invention in which an exclusive property or privilege is claimed are as follows:

1. A poultry cage system comprising, in combination: a plurality of poultry cages arranged in a row, each of said cages having a generally horizontal bottom panel and means defining an access opening extending in a vertical plane through which poultry confined therein can be removed, each of said cages including front panel means movable selectively between a first position relative said opening wherein said front panel means covers said opening to prevent movement of poultry therethrough and a second position wherein said front panel means is removed from said opening to permit discharge therethrough, a conveyor means fixably positioned along and extending substantially the length of said row immediately adjacent said openings and in substantially the same horizontal plane as the lower edge of each of said access openings for conveying poultry urged out of said cages through said openings whereby more than one of said cages may be emptied at the same time, and enclosure means having an open side facing all of said access openings for preventing premature departure of poultry conveyed on said conveyor means.

2. The combination according to claim 1 wherein said conveyor means includes an endless driven belt.

* * * * *